May 20, 1941.  W. SEYERLE  2,242,761
COOLING DEVICE FOR INTERNAL COMBUSTION ENGINES
Filed May 14, 1936   5 Sheets-Sheet 1
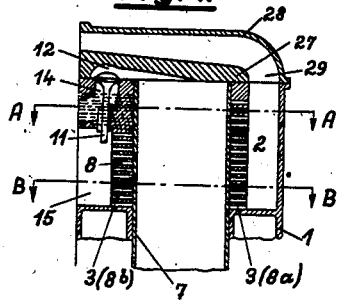
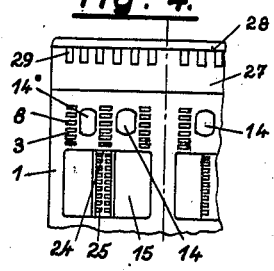
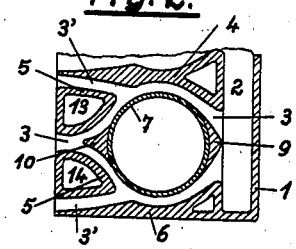
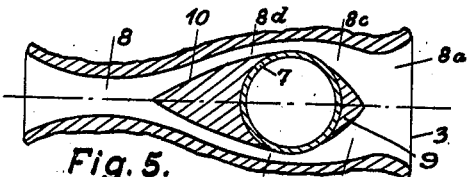
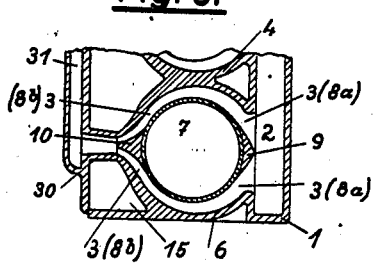
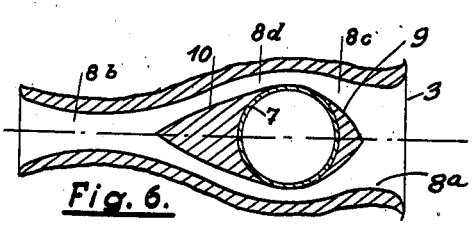
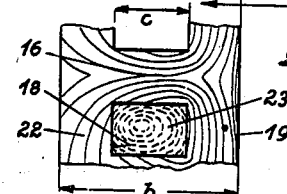
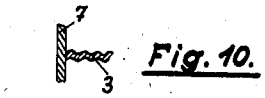
Inventor
Wilhelm Seyerle Inventor

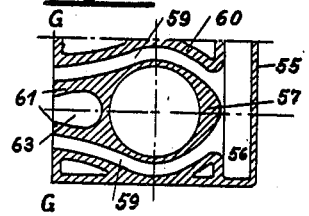
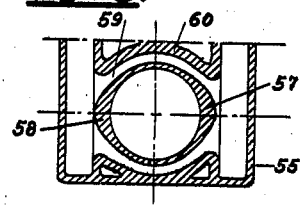
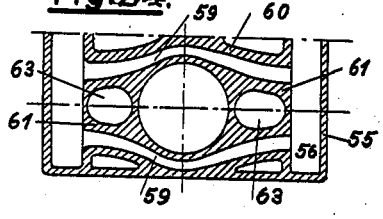
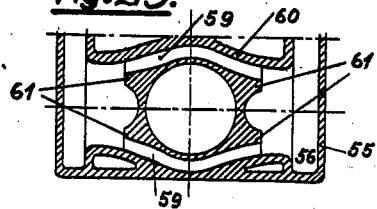

May 20, 1941. W. SEYERLE 2,242,761
COOLING DEVICE FOR INTERNAL COMBUSTION ENGINES
Filed May 14, 1936 5 Sheets-Sheet 4

INVENTOR:
WILHELM SEYERLE
BY
ATTORNEY

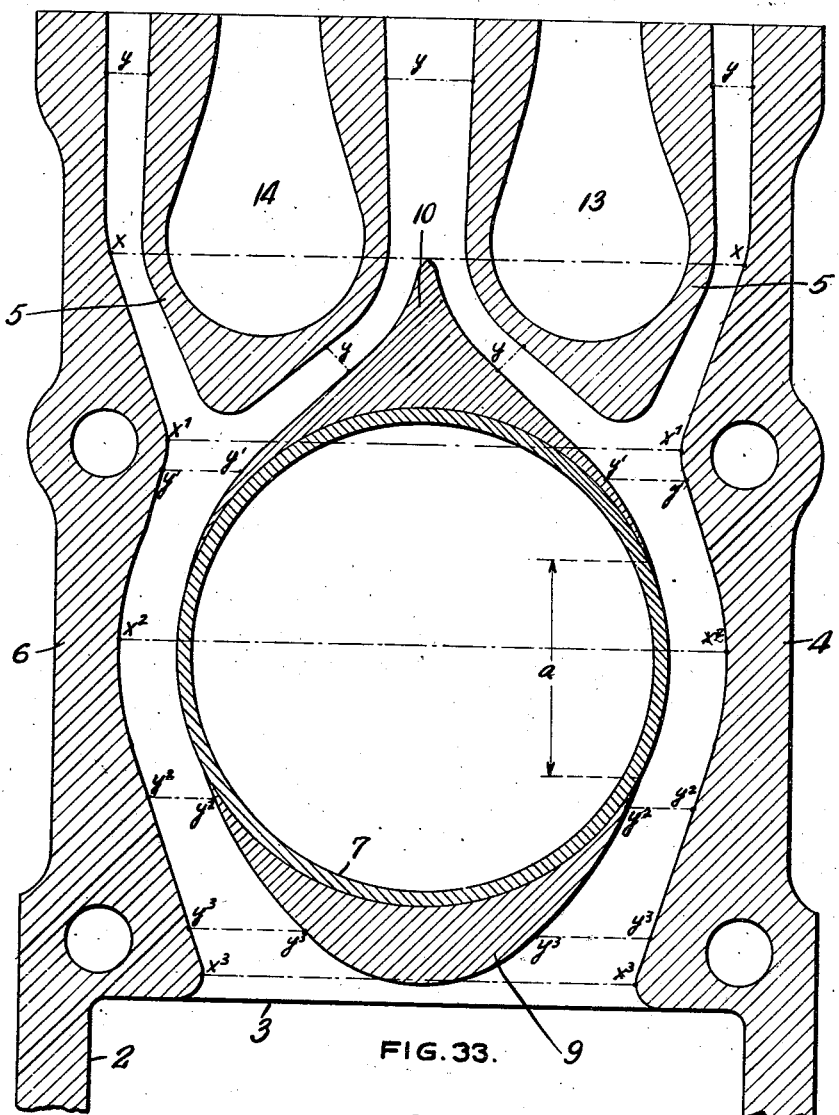
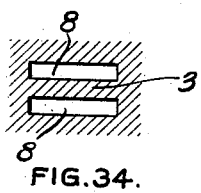
FIG. 33.
FIG. 34.
INVENTOR:
WILHELM SEYERLE
ATTORNEY

Patented May 20, 1941

2,242,761

UNITED STATES PATENT OFFICE 2,242,761

COOLING DEVICE FOR INTERNAL COMBUSTION ENGINES

Wilhelm Seyerle, Waldenbronn, near Esslingen-on-the-Neckar, Germany, assignor to Daimler-Benz Aktiengesellschaft, Stuttgart-Untertürkheim, Germany Application May 14, 1936, Serial No. 79,684
In Germany May 16, 1935

4 Claims. (Cl. 123—171)

This invention relates to a cooling device for internal combustion engines and more particularly to an arrangement for cooling the cylinders of such an engine.

An object of this invention is to improve the cooling arrangements for internal combustion engines.

Another object of this invention is the provision of improved cylinder cooling means for internal combustion engines.

Still another object of this invention is the provision of an improved cooling jacket for internal combustion engines.

A further object of this invention is to provide cooling passages about the cylinder of an internal combustion engine which permits flow of a cooling fluid about the cylinder without turbulence.

An additional object of this invention is the provision of a cooling arrangement for the cylinders of an internal combustion engine wherein a cooling fluid may flow in constant intimate contact about these cylinders and wherein the accumulation of hot masses of cooling fluid for turbulence wakes are prevented.

A specific object of this invention is the provision of improved cooling passages about the cylinder of an internal combustion engine in which the passages have a nozzle-like configuration and the cylinders present a thickened surface or mass of material to the oncoming and leaving cooling fluid to avoid turbulence and accumulations of hot stagnant cooling fluid.

Other objects and advantages of this invention will appear from a study of the following description of several constructional forms of this invention which are illustrated upon the accompanying drawings in which:

Fig. 1 is a longitudinal cross-sectional view through a cylinder block having a cylinder cover thereon illustrating an arrangement of cooling channels in accordance with this invention;

Fig. 2 is a transverse cross-sectional view along the line A—A of Fig. 1;

Fig. 3 is a transverse cross-sectional view along the line B—B of Fig. 1;

Fig. 4 is a front view of the cylinder block illustrated in Fig. 1;

Fig. 5 is a transverse cross-sectional view on an enlarged scale showing the form of cooling channel and cylinder construction according to this invention;

Fig. 6 is a transverse cross-sectional view similar to Fig. 5 illustrating a modified arrangement;

Fig. 7 is a transverse cross-sectional view similar to Figs. 5 and 6 illustrating a form of cooling channel;

Figs. 8 and 9 illustrate the respective manner of heat conduction according to the constructions used in the prior art as compared with the construction according to this invention;

Fig. 10 is a partial cross-sectional view of the cooling rib according to this invention;

Fig. 11 is a partial cross-sectional view of a modified form of cooling rib;

Fig. 22 is a cross-sectional view of still another cylinder cooling arrangement;

Fig. 23 is a cross-sectional view of still another cylinder cooling arrangement;

Fig. 24 is a cross-sectional view of still another cylinder cooling arrangement;

Fig. 25 is a cross-sectional view of still another cylinder cooling arrangement;

Fig. 33 is a transverse cross-sectional view upon an enlarged scale of the cooling arrangement illustrated in Fig. 32 having an inserted cylinder liner; and Fig. 34 is a cross-sectional view through the cooling channels of the arrangement according to Fig. 33.

Figure 12:
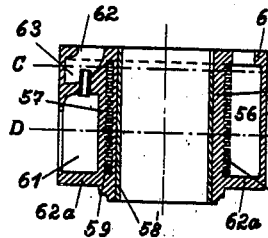
Fig. 12 is a longitudinal cross-sectional view of a cylinder block showing a modified construction as compared with Fig. 1.

A first constructional form of the cooling arrangement for cylinders of an internal combustion engine made in accordance with the principles of this invention is illustrated in Figs. 1 to 4 inclusive. As there shown, a cylinder block housing is made up of the elements 1, 4, and 6, and includes therein a collecting space or chamber 2 for the cooling medium of the cylinders which may be air under slight pressure which is led to the chamber 2 by a suitable conduit (not shown). The chamber 2 lies upon the intake side of a passage formed by and leading through the cylinder jacket walls 4 and 6 surrounding a cylinder liner 7. The passage is divided into individual cooling channels by means of ribs 3 which are spaced apart at a slight distance in the vertical direction, as seen in Figs. 1 and 4. The ribs are parallel to one another and preferably extend substantially at right angles to the cylinder axis. The ribs extend transversely of the entire length of the passage between the walls 4 and 6. The liner 7 may be either cast into the cylinder housing or shrunk firmly into place.

The novelty and principles of the construction illustrated in Figs. 1 to 4 inclusive may be best illustrated by reference to certain of the other figures. Fig. 7 shows a simple form of cooling passage which forms one of the features of my construction. As there shown, the cylinder liner 7 forms, together with the walls 4 and 6 and the ribs 3, a shallow nozzle-shaped channel which at its fluid supply side is in communication with the cooling chamber 2. By arranging the walls in the manner illustrated, the cooling medium passing from the chamber 2 through the passage neither stagnates in front of the cylinder liner 7 nor forms a turbulence wake behind it. This is because the entrance 8a of the nozzle channel is formed like a funnel with the convex wall 7 of the cylinder liner, which then forms a gradually narrowing passage 8c which reaches its narrowest point 8d immediately behind the liner and then again widens as indicated at 8b. This form of passage, as contrasted with known arrangements, will prevent accumulations of hot stagnant air or other cooling fluid in front of the cylinder liner and, likewise, will prevent turbulence wakes behind the liner. If such stagnant air portions or turbulence wakes are present, the cooling fluid will not at those points properly cool the liner so that hot spots are created, which will cause distortion of the liner and improper action within the cylinder.

The principles of the construction illustrated in Fig. 7 may be amplified to secure still better cooling of the cylinder by the arrangement shown for example in Fig. 6. In this construction a column or mass of solid material 9 is formed in front of the liner 7, as seen in the direction of flow of the cooling fluid, while another mass of material or column 10 is positioned behind the cylinder liner. The material 9 in front of the cylinder liner has a form similar to that of the mass of stagnant air which would be present if the round liner were directly hit by a column of the oncoming cooling air. In other words, instead of a mass of stagnant air in front of the cylinder liner, applicant substitutes this column of solid heat conducting material. Accordingly, the column 9 will always be in intimate heat conducting contact with the stream of air flowing along it. The liner 7 being in heat conducting relationship with the mass of material 9 will accordingly have its heat more efficiently abstracted.

The mass of material 10 positioned behind the cylinder liner 7 is, on the other hand, formed in the shape of a turbulence wake. Accordingly, instead of a turbulence wake of air occurring behind the cylinder liner 7, which turbulence wake would, because of its very character, prevent efficient heat conduction from the liner 7 at this point, applicant has substituted a solid mass of material in the shape of this wake, which mass of material will accordingly always be in contact with the freely flowing air. As a result, the heat conduction between the liner 7 and the air is greatly improved at this point. This form of construction is preferable to that illustrated in Fig. 7 as the resulting channels are more nozzle-like and the material columns 9 and 10 form a streamlined body having minimum air resistance.

The construction shown in Fig. 6 is illustrated upon an enlarged scale in Fig. 33 in which the total cross-section of the passage indicated by the distances $x^1$—$x^1$, $x^2$—$x^2$, $x^3$—$x^3$, and also the individual sections $y^1$—$y^1$, $y^2$—$y^2$, and $y^3$—$y^3$, develop the lowest possible air resistance and freedom from turbulence.

Turbulence within the cooling passages is also avoided by the fact that the air flowing from the collecting space 2 does not strike the edges of the ribs 3 in a sharp stream. This is because these ribs extend the entire length of the passage.

If, as illustrated in Figs. 1 and 2 and upon a larger scale in Fig. 33, space is necessary for the shafts of the cylinder valves, this space may be formed by sections of material 5 positioned as illustrated in the rear of the passage. These sections of material 5 are so formed in connection with the column 10 behind the cylinder that there will be no further turbulence at this point. This is brought about by forming forked channels $y$ (Fig. 33) or 3' (Fig. 2).

Below the valves, a special space 15 may be formed for housing the valve operating members (Fig. 3) while the valves themselves control the passage 14.

Fig. 10 illustrates the manner in which the cooling ribs 3 may be formed, if desired. In order to increase the cooling surface of these ribs, they may be given a wave-like shape as there indicated.

In accordance with the constructions described above, an advantageous arrangement may be made in which the housing walls of the cylinder as well as the columns of material and the ribs 3 may all be cast from one piece of material, such as light metal. This will result in a roomy integral unit comprising material penetrated by numerous fine cooling channels in which the heat is carried away as a result of the intimate association of the cooling medium with the hot spots of the cylinder and is readily transmitted to those surfaces having a greater cooling area. Because of the mass of integral material the heat can be carried away without any danger of localized overheating. This results in a complete and efficient utilization of the cooling medium. The advantages of this construction are clearly illustrated by a comparison of Figs. 8 and 9, Fig. 8 showing the arrangements heretofore used and Fig. 9 being a partial view of an arrangement in accordance with the present invention. As shown in Fig. 8, the cooling ribs 16 cast onto the cylinder wall 19 are covered by a thin metal casing 17. In both figures the height of the cooling channel and of the ribs is shown to be the same and in both figures the path of the heat movement is indicated by dotted cross-hatching. As is indicated, the heat from the cylinder surface 19 passes outwardly in the direction of the arrow a to the ribs 16. In the known form shown in Fig. 8, the heat passing from the cylinder through the ribs 16 quickly decreases so that by the time of contact between the ribs 16 and the sheet metal wall 17 there will be very little heat remaining and because of the joint between the wall 17 and the ribs 16 still less heat will be transmitted. As a result, most of the heat to be absorbed occurs approximately in the zone 20 whereas the zone 21 has practically no heat absorbing function. In contrast, the cooling medium in applicant's arrangement, as illustrated in Fig. 9, is utilized much more efficiently. Here, the ribs are only made of such length that they will absorb a large quantity of heat without damage (length C in Fig. 9). The remainder of the heat is taken care of by the exterior wall 22 which is in seamless communication with the rib 16 so that this wall also transmits heat to the cooling passage 18 on the opposite side from the cylinder wall 19. Although the cooling channel 18 in Fig. 9 has a smaller cross-sectional area than the grooves or openings 18 in Fig. 8, there will be a greater effective cooling surface. The real efficiency or utilization of the cooling medium is illustrated by the heat transmitting zone 23 of Fig. 9 as compared with the zones 20 and 21 of Fig. 8. If a plurality of cylinders are arranged adjacent to one another in a single block, a still greater saving of material can be brought about since the distance b shown in Fig. 9 can be decreased by moving the cylinders close together.

Another feature of this construction which is more clearly illustrated in Fig. 4 is that the upper groups of ribs 24 are wider than the lower ones 25. Since the upper part of the cylinder contains the main combustion space, it is therefore hotter and must carry away more heat than the lower parts. By this means, the cooling fluid will flow more easily and more quickly through the larger delivery passages than through the lower ones and thereby a proper adjustment of cooling effect is achieved in proportion to the heat developed and to be carried away.

Figure 26:
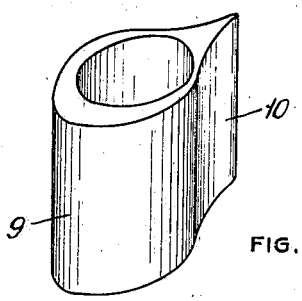
Fig. 26 is a perspective view of a smooth solid cylinder formed in accordance with the principles of this invention.
Figure 27:
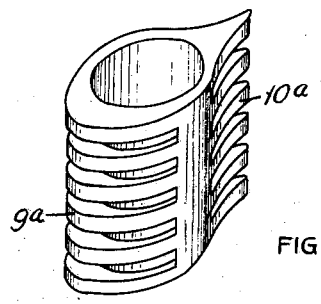
Fig. 27 is a perspective view of a ribbed cylinder similar to Fig. 26.
Figure 28:
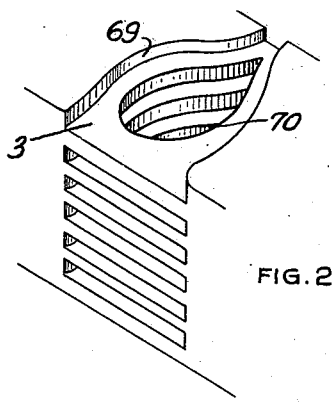
Fig. 28 is a perspective view of the rib system in the cooling fluid passage of the cylinder housing.
Figure 29:
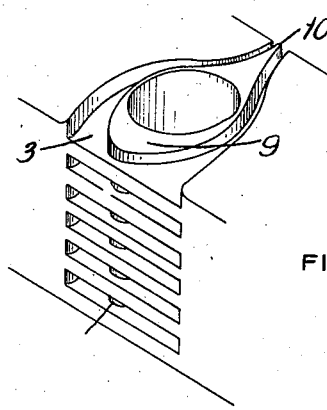
Fig. 29 is a perspective view of the rib system shown in Fig. 28 with the addition of an inserted cylinder liner.
Figures 30, 31, 32:
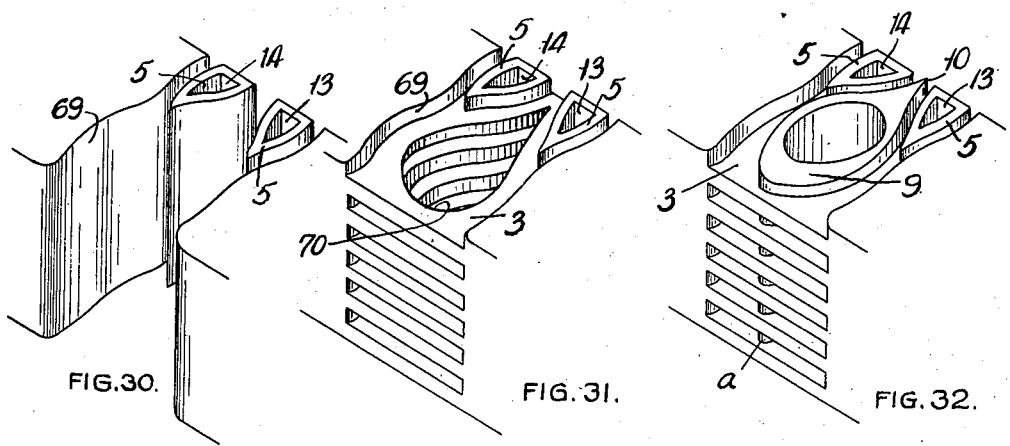
Fig. 30 is a perspective view of a cooling passage in the cylinder housing showing columns of material at the rear ends of the passage.
Fig. 31 is a perspective view of the rib system of Fig. 29 with the columns of Fig. 30 inserted in the cooling passage.
Fig. 32 is a perspective view of the combined arrangements according to Figs. 29 and 31.

The construction in accordance with this invention may be so developed that the masses of material 9 and 10 formed in front of and behind the cylinder may be merged together and fully enclose the cylinder liner. This construction is indicated in Fig. 6 and is more clearly shown in Fig. 11 in which the thin wall 26 will interconnect the masses in front of and behind the cylinder. If desired, a separate liner may be entirely omitted and as indicated in Fig. 26 the cylinder bore may be formed with integral masses 9 and 10. The integral construction may also include integral fins 9a and 10a, as shown in Fig. 27, which may be set into the nozzle-like passage 69, as shown in Fig. 30. Preferably, the passage 69 is provided with fins 3, as shown in Figs. 28 and 31. The ribs 3 will preferably have openings 70 to which the solid cylinder, as illustrated in Fig. 26, is attached, resulting in the construction illustrated in Figs. 29 or 32. If the masses of material do not meet, the construction shown in Fig. 5 will result.

Figure 13:
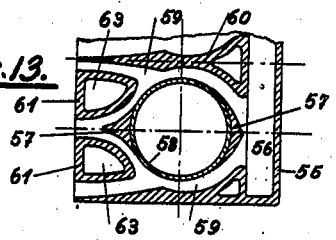
Fig. 13 is a transverse cross-sectional view along the line C—C of Fig. 12.
Figure 14:
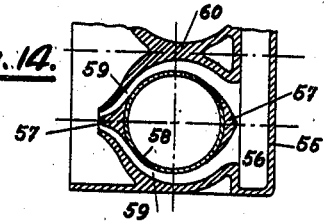
Fig. 14 is a transverse cross-sectional view along the line D—D of Fig. 12.

The mass of material serving for heat absorption may be increased by the arrangement illustrated in Figs. 12 to 14 inclusive. In this case, the cylinder block consists of a housing 55 formed with a cooling fluid chamber 56 and masses of material 57 in front of and behind the cylinder liner 58. A plurality of cooling channels are enclosed and formed by the transverse wall 60 and walls 55 and 61 of the cylinder block. The masses of material 57 lie between two solid plates indicated at 62 and 62a in Fig. 12, which are parallel to one another and at substantially right angles to the cylinder axis. These two plates are connected on one side to the hollow column 61 (Fig. 13) which may enclose the valve channels 63. The valve channels 63 may pass either through the upper plate 62 or through both plates 62 and 62a. Accordingly, these columns form a solid bridge of material extending from one plate to the other.

Figure 15:
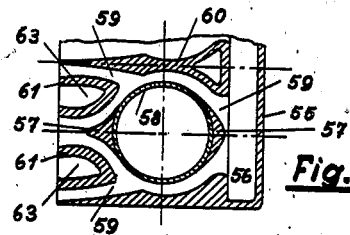
Fig. 15 is a transverse cross-sectional view of a further modified cylinder cooling arrangement.
Figure 16:
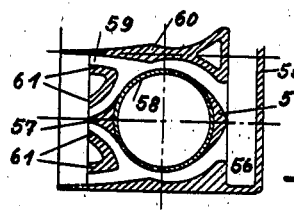
Fig. 16 is a cross-sectional view of still another cylinder cooling arrangement.
Figure 17:
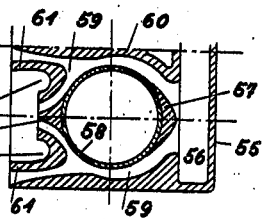
Fig. 17 is a cross-sectional view of still another cylinder cooling arrangement.
Figure 18:
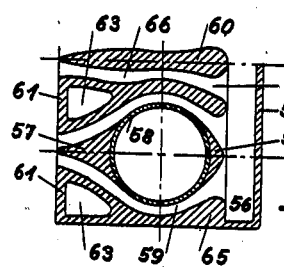
Fig. 18 is a cross-sectional view of still another cylinder cooling arrangement.
Figure 20:
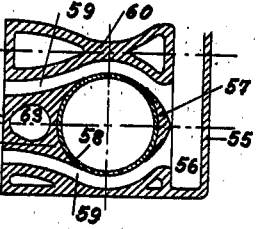
Fig. 20 is a cross-sectional view of still another cylinder cooling arrangement.
Figure 19:
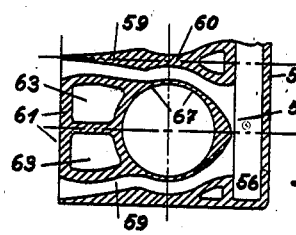
Fig. 19 is a cross-sectional view of still another cylinder cooling arrangement.
Figure 21:
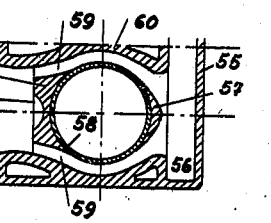
Fig. 21 is a cross-sectional view of still another cylinder cooling arrangement.

Figs. 15 to 21 inclusive may be all considered as possible modifications of the arrangement illustrated in Fig. 12 and as modified cross-sectional views along the line C—C of Fig. 12. In Fig. 15, the columns 61 are shown as open at one end similarly to the columns 5 of Fig. 33. In Fig. 16, the columns are formed shorter than those of Fig. 15. In Fig. 17, only the inner column walls are made shorter, the outer wall 61 extending to the end of the housing. In Fig. 18, the columns 61 merge with the wall 60 and the walls 65 of the cylinder block and additional cooling channels 66 are indicated which do not touch either the cylinder liner or the cylinder. In Fig. 19, the columns are merged with the mass of material 57 so that in this form a separate inserted liner is not necessary but the cylinder surface is formed through the integral walls 67. In Fig. 20, only a single valve channel is provided whose walls 61 merge into a mass of material 68 surrounding the cylinder 58. The same arrangement is indicated in Fig. 21; here, however, the valve shaft 63 being kept open and the dividing walls 61 cut off. In contradistinction to the form illustrated in Fig. 21, in Fig. 22 the walls 61 are extended up to the plane G—G of the plates 62 and 62a.

Figs. 23, 24, and 25 show a construction which may be used where one valve is located on each side of the cylinder or where the valves are entirely placed in the cylinder head. In this case the symmetrical constructions here illustrated may be utilized and flow through the cooling passages may take place from either direction.

Nozzle-like canals which have been illustrated as extending about the cylinder can also be used in the cylinder head where it is connected with the cooling system. This is illustrated in Figs. 1 and 4 in which the cover 28 of the cylinder head is removable, exposing the connecting canals 29. Additionally, the walls 1 or 6 of the cylinder housing may also be releasably attached so that the cooling canals will be exposed. If, as is sometimes desirable, one wishes to utilize the cooling fluid after it has passed about the cylinders, this fluid can be conducted away by a tube 30 as shown in Fig. 3. In order to preserve the efficient stream conditions of the fluid, the tube 30 is formed preferably in the shape of a nozzle relative to the connected cooling passages. There will, accordingly, be no turbulence arising because of the connection with this tube. If the fluid is led away from a series of cylinders, the tube 30 can be interconnected through a tube indicated at 31 in Fig. 3.

The cylinders and other members of my cooling arrangement may be formed from any material desired. If, for example, the housing is made of cast iron and the cylinder liner of steel, it is also sometimes advantageous to coat those portions to be contacted by the cooling fluid with a material having good heat conducting characteristics. Some such light metal may be added either mechanically by spraying or chemically by electrolytic action. On the other hand, the entire cooling system may be formed from a light material, in which case, additional coating will not be necessary.

This invention has been described particularly for use with the air cooling of engine cylinders. It will be obvious, however, to those skilled in the art that water and oil cooling as well as other known cooling materials can be advantageously used as well as air.

While I have described several forms of my invention and several ways in which it may be applied to the cooling of engine cylinders, I do not intend to be limited to the precise constructions illustrated but only as may be required by the claims which follow:

I claim:

1. In a cooling system for the cylinder of an internal combustion engine, the combination comprising a cylinder adapted to be cooled by a fluid flowing about it, a solid mound of metal positioned before the cylinder in the direction of flow of and in direct contact with the fluid, which has a cross-sectional form, as seen in a plane lying substantially perpendicular to the cylinder axis, as would be formed by the dammed portion of a cooling means freely flowing against the round cylinder form and there being dammed, and a further solid mound of metal positioned behind the cylinder in direct contact with the fluid, which has a cross-sectional form, as seen in a plane lying substantially perpendicular to the cylinder axis, in the shape of a turbulence wake as would be formed by the turbulence wake of a cooling fluid freely flowing away from the round cylinder form.

2. The combination according to claim 1, in combination with a jacket having a nozzle-like passage for guiding the cooling means about the cylinder, and surrounding the cylinder and its mounds of metal, the walls of the nozzle-like passage being formed in such a manner that there is no damming of the cooling fluid in front of the cylinder and no turbulence wake behind the cylinder, and ribs in the passage positioned at a slight distance from one another and extending substantially over the entire length of the passage.

3. In a cooling system for the cylinder of an internal combustion engine, the combination comprising a cylinder adapted to be cooled by a fluid flowing about it, a solid mound of metal positioned before the cylinder in the direction of flow of and in direct contact with the fluid, which has a cross-sectional form, as seen in a plane lying substantially perpendicular to the cylinder axis, as would be formed by the dammed portion of a cooling means freely flowing against the round cylinder form and there being dammed, a further solid mound of metal positioned behind the cylinder in direct contact with the fluid, which has a cross-sectional form, as seen in a plane lying substantially perpendicular to the cylinder axis, in the shape of a turbulence wake as would be formed by the turbulence wake of a cooling fluid freely flowing away from the round cylinder form, a jacket extending about the cylinder and having a nozzle-like passage for guiding the cooling means about the cylinder, the walls of said nozzle-like passage extending in such a manner that, as seen in the direction of flow of the cooling fluid there will be no damming of the fluid in front of the cylinder and no turbulence wake behind it, and ribs in the passage positioned at a slight distance from one another and extending substantially over the entire length of the passage, and solid plates of material above and below along the cooling device, both plates lying substantially parallel to the cooling ribs and enclosing the entire cooling system.

4. In a cooling system for the cylinder of an internal combustion engine, the combination comprising a cylinder adapted to be cooled by a fluid flowing about it, a solid mound of material positioned before the cylinder in the direction of flow of and in direct contact with the fluid, which has a cross-sectional form, as seen in a plane lying substantially perpendicular to the cylinder axis, as would be formed by the dammed portion of a cooling means freely flowing against the round cylinder form and there being dammed, a further solid mound of material positioned behind the cylinder which has a cross-sectional form, as seen in a plane lying substantially perpendicular to the cylinder axis, in the shape of a turbulence wake as would be formed by the turbulence wake of a cooling fluid freely flowing away from the round cylinder form, a jacket extending about the cylinder and having a nozzle-like passage for guiding the cooling means about the cylinder, the walls of said nozzle-like passage extending in such a manner that, as seen in the direction of the cooling fluid, there will be no damming of the fluid in front of the cylinder and no turbulence wake behind it, ribs in the passage positioned at a slight distance from one another and extending substantially over the entire length of the passage, a chamber for the fluid at the onstreaming side of the ribs from which the fluid flows without turbulence into the cooling passages, branch canals formed at the outflowing side of the nozzle-like passage for increasing the mass of material abstracting the heat and the cooling surface, and solid plates of material above and below along the cooling device, both plates lying substantially parallel to the cooling ribs and enclosing the entire cooling system, the ribs, the cylinder, the moulds of material in front of and after it, and the cylinder being cast from a single piece of light metal.

WILHELM SEYERLE.

CERTIFICATE OF CORRECTION.

Patent No. 2,242,761. May 20, 1941.

WILHELM SEYERLE.

It is hereby certified that error appears in the printed specification of the above numbered patent requiring correction as follows: Page 1, first column, line 24, for "fluid for" read --fluid or--; and that the said Letters Patent should be read with this correction therein that the same may conform to the record of the case in the Patent Office.

Signed and sealed this 8th day of July, A. D. 1941.

(Seal)

Henry Van Arsdale,
Acting Commissioner of Patents.